(12) United States Patent
Turner (10) Patent No.: US 7,562,489 B2
(45) Date of Patent: Jul. 21, 2009

(54) LIGHT EMITTING FISHING LURE WHICH RELEASES SCENT, EMITS SOUND AND GENERATES ELECTRICITY

(75) Inventor: Randal Scott Turner, 3528 Alyson Dr., Granite falls, WA (US) 98252

(73) Assignee: Randal Scott Turner, Granite Falls, WA (US)

(*) Notice: Subject to any disclaimer, the term of this patent is extended or adjusted under 35 U.S.C. 154(b) by 172 days.

(21) Appl. No.: 11/735,920

(22) Filed: Apr. 16, 2007

(65) Prior Publication Data

US 2008/0092429 A1      Apr. 24, 2008

Related U.S. Application Data

(60) Provisional application No. 60/862,608, filed on Oct. 24, 2006.

(51) Int. Cl.
*A01K 85/01* (2006.01)
(52) U.S. Cl. .............. 43/17.6; 43/42.06; 43/42.33; 43/42.22; 43/42.39; 43/42.46
(58) Field of Classification Search ............... 43/17.5, 43/17.6, 42.06, 26.2, 26.1, 17.1, 42.39, 42.22, 43/42.2, 42.21, 42.32, 42.33, 42.34, 42.46, 43/42.09
See application file for complete search history.

(56) References Cited

U.S. PATENT DOCUMENTS

| | | | | |
|---|---|---|---|---|
| 800,536 A | * | 9/1905 | Bailey et al. | 43/42.39 |
| 1,009,968 A | * | 11/1911 | Herrmann | 43/17.6 |
| 1,380,876 A | * | 6/1921 | Warden | 43/17.6 |
| 1,529,459 A | * | 3/1925 | Wunderlin | 43/17.6 |
| 1,617,091 A | * | 2/1927 | Wunderlin | 43/17.6 |
| 1,737,683 A | * | 12/1929 | Readman | 43/42.32 |
| 1,740,335 A | * | 12/1929 | Cowan | 43/42.09 |
| 1,776,090 A | * | 9/1930 | Shroyer | 43/42.09 |
| 1,833,241 A | * | 11/1931 | Wright | 43/17.6 |
| 1,900,339 A | * | 3/1933 | Harrell | 43/17.6 |
| 1,982,609 A | * | 11/1934 | Freese | 43/17.6 |
| 1,993,798 A | * | 3/1935 | Peterson | 43/42.22 |
| 2,002,135 A | * | 5/1935 | Barton | 43/17.6 |

(Continued)

FOREIGN PATENT DOCUMENTS

CH            617831 A   *   6/1980

(Continued)

*Primary Examiner*—Darren W Ark (57) ABSTRACT

A fishing lure assembly utilizing a shaft less electric generator which does not require exterior moving components such as a propeller, shaft and bearing to activate the generator, The lure assembly is made up of two segments with a receiver for a weight, a chromed paper insert and a shaft less generator within the nose segment, and a reservoir for holding scent material in the tail segment. These segments are arranged along a longitudinal axis, with rotation being imparted to the assembly by angled fins on the nose segment; and of which rotating motion activates said generator to release electrical current which powers light emitting diodes, which in turn illuminates the fishing lure through a translucent body; along with a tail portion having a reservoir for inserting scented fish attractant, along with holes to allow water to flow into and exit out of the reservoir, which disperses scented fish attractant into the water slowly as the lure is trolled through the water, along with sound attractant caused by said generators magnet when said generator is rotating.

15 Claims, 10 Drawing Sheets

U.S. PATENT DOCUMENTS

| | | | | |
|---|---|---|---|---|
| 2,070,755 A * | 2/1937 | Seigle et al. | | 43/17.6 |
| 2,121,114 A * | 6/1938 | Beck | | 43/17.6 |
| 2,190,791 A * | 2/1940 | Larson | | 43/17.6 |
| 2,197,372 A * | 4/1940 | Bailey | | 43/17.6 |
| 2,217,565 A * | 10/1940 | Seigle et al. | | 43/17.6 |
| 2,309,521 A * | 1/1943 | Mabee | | 43/42.33 |
| 2,500,442 A * | 3/1950 | Walte | | 43/17.6 |
| 2,528,083 A * | 10/1950 | Ruff | | 43/17.6 |
| 2,529,642 A * | 11/1950 | Vaughn et al. | | 43/42.09 |
| 2,550,988 A * | 5/1951 | Flournoy | | 43/17.6 |
| 2,552,224 A * | 5/1951 | Setterblade | | 43/17.6 |
| 2,563,282 A * | 8/1951 | Schenck | | 43/42.22 |
| 2,568,488 A * | 9/1951 | Cummins | | 43/42.09 |
| 2,573,592 A * | 10/1951 | Nickel | | 43/42.09 |
| 2,592,445 A * | 4/1952 | McCarthy | | 43/42.33 |
| 2,598,471 A * | 5/1952 | Waite | | 43/17.6 |
| 2,599,035 A * | 6/1952 | Wing | | 43/42.33 |
| 2,665,511 A * | 1/1954 | Bradberry | | 43/42.33 |
| 2,694,877 A * | 11/1954 | Wise | | 43/42.33 |
| 2,733,535 A * | 2/1956 | Rosen | | 43/42.33 |
| 2,740,220 A * | 4/1956 | Caplan | | 43/17.6 |
| 2,741,058 A * | 4/1956 | Allman et al. | | 43/42.39 |
| 2,736,981 A * | 6/1956 | Bonanno | | 43/42.39 |
| 2,749,646 A * | 6/1956 | Hall | | 43/42.39 |
| 2,752,721 A * | 7/1956 | Denny | | 43/42.33 |
| 2,754,610 A * | 7/1956 | Carlson | | 43/17.6 |
| 2,757,475 A * | 8/1956 | Pankove | | 43/17.1 |
| 2,763,954 A * | 9/1956 | Bunker | | 43/42.39 |
| 2,769,268 A * | 11/1956 | Miller | | 43/42.06 |
| 2,817,920 A * | 12/1957 | Mitchell et al. | | 43/26.2 |
| 2,832,169 A * | 4/1958 | Clapp | | 43/42.31 |
| 2,862,325 A * | 12/1958 | Magnus | | 43/42.22 |
| 2,884,732 A * | 5/1959 | Bailer | | 43/42.33 |
| 2,897,623 A * | 8/1959 | Flournoy | | 43/17.6 |
| 2,909,863 A * | 10/1959 | Rector et al. | | 43/42.39 |
| 2,940,205 A * | 6/1960 | Cherry | | 43/42.39 |
| 2,955,375 A * | 10/1960 | Mitchell | | 43/17.6 |
| 2,983,065 A * | 5/1961 | Ferguson et al. | | 43/42.09 |
| 2,994,982 A * | 8/1961 | Murawski | | 43/42.39 |
| 2,994,983 A * | 8/1961 | Best | | 43/42.09 |
| 3,031,792 A * | 5/1962 | Swenson | | 43/42.2 |
| 3,035,368 A * | 5/1962 | Collins | | 43/42.39 |
| 3,040,462 A * | 6/1962 | Guida | | 43/17.6 |
| 3,069,801 A * | 12/1962 | Mills | | 43/42.33 |
| 3,077,046 A * | 2/1963 | Murray | | 43/17.6 |
| 3,210,882 A * | 10/1965 | Purdom | | 43/42.33 |
| 3,257,751 A * | 6/1966 | Benttinen et al. | | 43/42.33 |
| 3,264,775 A * | 8/1966 | Nahigian | | 43/42.39 |
| 3,336,692 A * | 8/1967 | Knight | | 43/42.33 |
| 3,340,643 A * | 9/1967 | Weimer | | 43/42.39 |
| 3,359,674 A * | 12/1967 | Strumor | | 43/42.06 |
| 3,367,060 A * | 2/1968 | Abercrombie | | 43/42.33 |
| 3,393,465 A * | 7/1968 | Powell | | 43/42.39 |
| 3,393,466 A * | 7/1968 | Le Master | | 43/42.39 |
| 3,416,254 A * | 12/1968 | Bornzin | | 43/17.1 |
| 3,505,754 A * | 4/1970 | Lawlor | | 43/42.22 |
| 3,530,612 A * | 9/1970 | Garrison | | 43/42.39 |
| 3,535,812 A * | 10/1970 | Crecelius | | 43/17.6 |
| 3,540,144 A * | 11/1970 | Gurka | | 43/42.33 |
| 3,608,228 A * | 9/1971 | Borresen et al. | | 43/17.6 |
| 3,621,600 A * | 11/1971 | Dworski | | 43/42.39 |
| 3,696,251 A * | 10/1972 | Last et al. | | 290/53 |
| 3,708,903 A * | 1/1973 | Bercz et al. | | 43/17.6 |
| 3,762,092 A * | 10/1973 | Bercz et al. | | 43/17.6 |
| 3,885,340 A * | 5/1975 | Volenec | | 43/42.33 |
| 3,895,455 A * | 7/1975 | Johnston | | 43/17.6 |
| 3,909,974 A * | 10/1975 | Kent | | 43/42.39 |
| 3,916,556 A * | 11/1975 | Armanno | | 43/42.06 |
| 3,940,868 A * | 3/1976 | Northcutt | | 43/17.6 |
| 3,952,445 A * | 4/1976 | Liebert | | 43/42.34 |
| 3,955,304 A * | 5/1976 | Reid | | 43/42.39 |
| 3,969,839 A * | 7/1976 | Ziegler | | 43/17.6 |
| 4,047,317 A * | 9/1977 | Pfister | | 43/42.06 |
| 4,073,084 A * | 2/1978 | Favron | | 43/42.39 |
| 4,114,305 A * | 9/1978 | Wohlert et al. | | 43/17.6 |
| 4,155,192 A * | 5/1979 | Varaney | | 43/42.32 |
| 4,175,348 A * | 11/1979 | Ray | | 43/17.6 |
| 4,234,913 A * | 11/1980 | Ramme | | 43/17.6 |
| 4,250,650 A * | 2/1981 | Fima | | 43/17.6 |
| 4,250,651 A * | 2/1981 | Ramme | | 43/17.6 |
| 4,267,658 A * | 5/1981 | Brown et al. | | 43/42.06 |
| 4,426,803 A * | 1/1984 | Helling | | 43/17.6 |
| 4,553,348 A * | 11/1985 | Cooper | | 43/42.06 |
| 4,625,447 A * | 12/1986 | Buchanan | | 43/17.1 |
| 4,638,584 A * | 1/1987 | Lindsay | | 43/17.6 |
| 4,676,020 A * | 6/1987 | Taylor et al. | | 43/42.06 |
| 4,709,176 A * | 11/1987 | Ridley et al. | | 310/15 |
| 4,741,120 A * | 5/1988 | Cota et al. | | 43/17.6 |
| 4,757,632 A * | 7/1988 | Grobl | | 43/17.6 |
| 4,791,750 A * | 12/1988 | Gammill | | 43/42.31 |
| 4,799,327 A * | 1/1989 | Treon | | 43/17.6 |
| 4,805,339 A * | 2/1989 | Fuentes et al. | | 43/42.31 |
| 4,811,513 A * | 3/1989 | Grobl | | 43/17.6 |
| 4,819,361 A * | 4/1989 | Boharski | | 43/17.6 |
| 4,888,905 A * | 12/1989 | Garr | | 43/17.6 |
| 5,024,019 A * | 6/1991 | Rust et al. | | 43/42.31 |
| 5,036,617 A * | 8/1991 | Waldrip | | 43/42.33 |
| 5,038,513 A * | 8/1991 | Hardin | | 43/42.31 |
| 5,144,765 A * | 9/1992 | Keeton | | 43/42.31 |
| 5,159,773 A * | 11/1992 | Gentry et al. | | 43/17.1 |
| 5,175,950 A * | 1/1993 | Linder | | 43/17.1 |
| 5,203,103 A * | 4/1993 | Hawley | | 43/17.1 |
| 5,224,285 A * | 7/1993 | Kamin et al. | | 43/42.06 |
| 5,331,762 A * | 7/1994 | Banks | | 43/42.09 |
| 5,367,817 A * | 11/1994 | Clark | | 43/42.39 |
| 5,461,815 A * | 10/1995 | Rodgers | | 43/17.6 |
| 5,903,999 A * | 5/1999 | Petras | | 43/17.6 |
| 5,918,405 A * | 7/1999 | Marusak et al. | | 43/42.09 |
| 5,926,993 A * | 7/1999 | Marusak et al. | | 43/42.09 |
| 5,953,849 A * | 9/1999 | Boucher, Jr. | | 43/42.39 |
| 5,983,553 A * | 11/1999 | Gordon | | 43/17.6 |
| 6,006,464 A * | 12/1999 | Tregre | | 43/42.31 |
| 6,029,388 A * | 2/2000 | Yokogawa et al. | | 43/17.6 |
| 6,052,938 A * | 4/2000 | Marusak et al. | | 43/42.09 |
| 6,058,643 A * | 5/2000 | Marusak et al. | | 43/42.34 |
| 6,141,900 A * | 11/2000 | Rudolph | | 43/42.31 |
| 6,176,035 B1 * | 1/2001 | Somogyi | | 43/42.2 |
| 6,192,617 B1 * | 2/2001 | Lyles | | 43/17.6 |
| 6,226,917 B1 * | 5/2001 | Sylla et al. | | 43/17.6 |
| 6,301,822 B1 * | 10/2001 | Zernov | | 43/42.31 |
| 6,481,148 B1 * | 11/2002 | Lindgren | | 43/17.5 |
| 6,546,666 B2 * | 4/2003 | Schultz et al. | | 43/17.6 |
| 6,647,659 B1 * | 11/2003 | King et al. | | 43/17.6 |
| 6,671,995 B1 * | 1/2004 | Harkin | | 43/17.6 |
| 6,807,766 B1 * | 10/2004 | Hughes et al. | | 43/17.6 |
| 6,836,997 B2 * | 1/2005 | Cramsey | | 43/42.06 |
| 6,880,288 B1 * | 4/2005 | Hanes | | 43/42.39 |
| 6,922,935 B2 * | 8/2005 | Yu | | 43/17.6 |
| 6,978,571 B1 * | 12/2005 | Nemire | | 43/42.31 |
| 7,028,430 B2 * | 4/2006 | Gironda | | 43/42.22 |
| 7,114,280 B2 * | 10/2006 | Turner | | 43/17.6 |
| 7,263,797 B1 * | 9/2007 | Trillo | | 43/17.6 |
| 7,361,074 B1 * | 4/2008 | Periman et al. | | 446/242 |
| 7,380,365 B2 * | 6/2008 | Noraker | | 43/42.06 |
| 7,448,159 B2 * | 11/2008 | Berge | | 43/42.06 |
| 7,520,086 B2 * | 4/2009 | Melhorn et al. | | 43/42.06 |
| 2002/0157300 A1 * | 10/2002 | Saul | | 43/42.33 |
| 2004/0244265 A1 * | 12/2004 | Miyata et al. | | 43/17.6 |
| 2006/0032109 A1 * | 2/2006 | Chiodo | | 43/42.09 |
| 2006/0265932 A1 * | 11/2006 | Davis | | 43/17.1 |
| 2008/0196293 A1 * | 8/2008 | Milanowski | | 43/42.2 |

| | | | | | |
|---|---|---|---|---|---|
| 2008/0289241 A1 * | 11/2008 | Hawryshyn et al. ........ 43/17.6 | JP | 2000157107 A * | 6/2000 |
| | | | JP | 2000189004 A * | 7/2000 |
| FOREIGN PATENT DOCUMENTS | | | JP | 2001224281 A * | 8/2001 |
| | | | JP | 2002171883 A * | 6/2002 |
| DE | 4205848 A1 * | 9/1993 | JP | 2002199828 A * | 7/2002 |
| EP | 1413193 A1 * | 4/2004 | JP | 2003204735 A * | 7/2003 |
| FR | 2720894 A1 * | 12/1995 | JP | 2004065207 A * | 3/2004 |
| FR | 2876545 A3 * | 4/2006 | JP | 2004215609 A * | 8/2004 |
| FR | 2896954 A1 * | 8/2007 | JP | 2004261046 A * | 9/2004 |
| GB | 2340370 A * | 2/2000 | JP | 2005341826 A * | 12/2005 |
| JP | 01112938 A * | 5/1989 | WO | WO 9933337 A1 * | 7/1999 |
| JP | 10127210 A * | 5/1998 | | | |
| JP | 11196716 A * | 7/1999 | * cited by examiner | | |
| JP | 11253071 A * | 9/1999 | | | |

LIGHT EMITTING FISHING LURE WHICH RELEASES SCENT, EMITS SOUND AND GENERATES ELECTRICITY

CROSS REFERENCE TO RELATED APPLICATION

This application claims the benefit of earlier filed provisional application # 60,862,608 filed: Oct. 24, 2006.

BACKGROUND OF THE INVENTION

1. Field of Invention

The present invention relates generally to artificial fishing lures, and more particularly, to a fishing lure assembly capable of generating electricity without requiring exterior moving components, such as a shaft/bearing, and of which also utilizes scent and sound attractants from within the fishing lure/flasher body which produces light along with releasing scent and emitting sound from hollow chambers within said lure or flasher assemblies.

2. Related Art

It is well known that fish are attracted to light and has been used in the commercial fishing industry for over a decade with chemically illuminated lures or battery powered light emitting lures, It is also well know that fish are attracted by scent and is used in artificial fishing baits as well as chum that is dispersed into the water to attract fish near boats to help produce larger catches using various oils and amino acids with synthetic and natural ingredients, It is also known that sound can attract fish and is used in fishing lures with a number of different devices from electronic to mechanical noise makers.

However, most electrically powered lures use batteries which need to be replaced frequently and chemically illuminated lures need replacement light sticks both of which place time limits on the use of the fishing lure and recurring costs for replacement batteries or light sticks.

There has also not been a fishing lure invented or manufactured to date that produces electricity by means of a shaft less generator which is activated by the rotational motion of the lure and does not require an exterior propeller, shaft, and/or bearings to activate the generator and supply current to the lighting apparatus weather it be a light bulb or light emitting diode, and of which can easily be removed from said lure body for repairs or replacement if failure accurse and of which also allows the light emitting diodes to be changed with different colored light emitting diodes.

There has also not been a fishing lure assembly with said abilities invented or manufactured that also has replaceable colored chrome inserts that allows the lure or flasher to easily change colors by inserting said inserts of the color desired by the angler using said lure assembly.

The problems with all present generator lure inventions like that by Boharski U.S. Pat. No. 4,819,361 is that they require a shaft and bearing with a propeller or other apparatus mounted on the exterior portion of the lure, which pose a number of problems from water leakage in to the generator as the shaft or bearing wears out from usage, along with weeds and other vegetation within the lake, ocean or river, which can clog or tangle in the propeller, or the fishing line getting tangling within the propeller blades, or damaging the propeller blades if hit against any hard objects, rock, boat or stump when casting the lure or removing the lure from the water.

The present invention solves these problems by not requiring an exterior shaft, bearing or propeller to activate the generator, but is self contained within the lure assembly, the spinning motion of the lure assembly activates the generator, which is encapsulated within and removes any worry of damage to exterior moving parts, furthermore there has been no lure to date that combines a shaft less generator that generates electricity to power light emitting diodes along with a scent release chamber that releases fish attracting scent, along with a sound emitting device, and replaceable colored chrome inserts.

Accordingly, there exists a need for a fishing lure that is capable of utilizing a generator that does not require exterior moving components.

Furthermore, there exists a need for such a fishing lure that employs the use of such a generator in an effective easy to use manner in a variety of fishing environments and conditions without worry of damaging exterior moving parts.

Still further, there exists a need for such a fishing lure which releases scent from an inner reservoir, and of which will easily change color with removable chrome colored inserts, which will reflect outward when an internal light source shines onto said inserts, which will allow it to attract many fish species, which are attracted to different colors depending on what type of pray are native to the waters which are being fished, for example, some salmon species are attracted to pink colored lures simulating the pink colored shrimp they feed on, where other species of fish are attracted to green or blue colored lures and flashers which simulating bait fish they feed on.

Still further, there exists a need for such a fishing lure which also utilizes a sound attractant.

Still further, there exists a need for such a lure that is durable and long lasting, yet that is economical to manufacture.

SUMMARY OF THE INVENTION

The present invention has solved the problems cited above, and is a fishing lure, assembly capable of generating electricity by housing a small generator which does not require an exterior shaft and propeller and is sealed within the lure or flasher and is activated when the lure assembly is in use and spinning.

Broadly, the lure assembly comprises: a first portion of a durable non magnetic translucent plastic housing of which has a hollow cavity within that encapsulates a stainless steel weight and colored chrome paper which fits over said weight, a shaft less generator which has Light emitting diodes mounted on the top portion of said generator, along with a dome shaped magnifying lens.

The first portion of the lure assembly further comprises means for imparting rotation to the lure assembly in response to the assembly being drawn through water.

The inlet port may comprise a mouth opening that faces towards the direction of rotation of the lure assembly, so that rotation of the assembly forces water into the mouth opening so as to create a positive flow through the reservoir.

a second portion having a reservoir for holding a supply of scent material, means for creating a flow of water through the reservoir so that the scent material is solubilized therein and released from the lure assembly, a shaft less generator with a barrel or ball shaped magnet, which spins freely within a hollow inner circular chamber revolving through insulated copper coil windings, which are wound around the outer potion of said circular hollow chamber and connected to light emitting diodes, as the magnet spins inside said lure or flasher assembly it releases electrons into said insulated copper wire which is connected to light emitting diodes and activates them when in use.

Said magnet spins in one direction caused by angled fins on the exterior body of the lure or flasher body while being trolled through the water, creating an electrical charge without the use of batteries, and produces electrical current sufficient to activate light emitting diodes, which in turn illuminate through a clear magnifying dome shaped lens, which is directed into the center of the inner hollow tube shaped cavity, and onto a cone shaped chrome paper insert which is placed over the steel weight within.

The means for detachably mounting said first and second portions.

The lure body consist of a translucent durable plastic with all sides visible allowing the light from the diodes to illuminate off of said chrome paper insert then outward onto the outer fins, and of which lure assembly also has a connecting tail portion that is fastened by stainless steel non-magnetic bolts or like connections, and of which has a hollow chamber/reservoir within that can hold any type of scent attractant material such as oils or blood which are soaked and slowly released from a sponge which is inserted into said chamber or solid amino acid powders which dissolve slowly and releases said attracting scent into the water from holes located at the rear of said housing while being retrieved or trolled through the water, and of which also emits sound when said magnet rolls inside of the generators hollow circular inner chamber/cavity, and which sound may attracts fish to the lure.

These and other features and advantages of the present invention will be more fully understood from the following detailed description with reference to the accompanying drawings.

DETAILED DESCRIPTION

Figure 1:
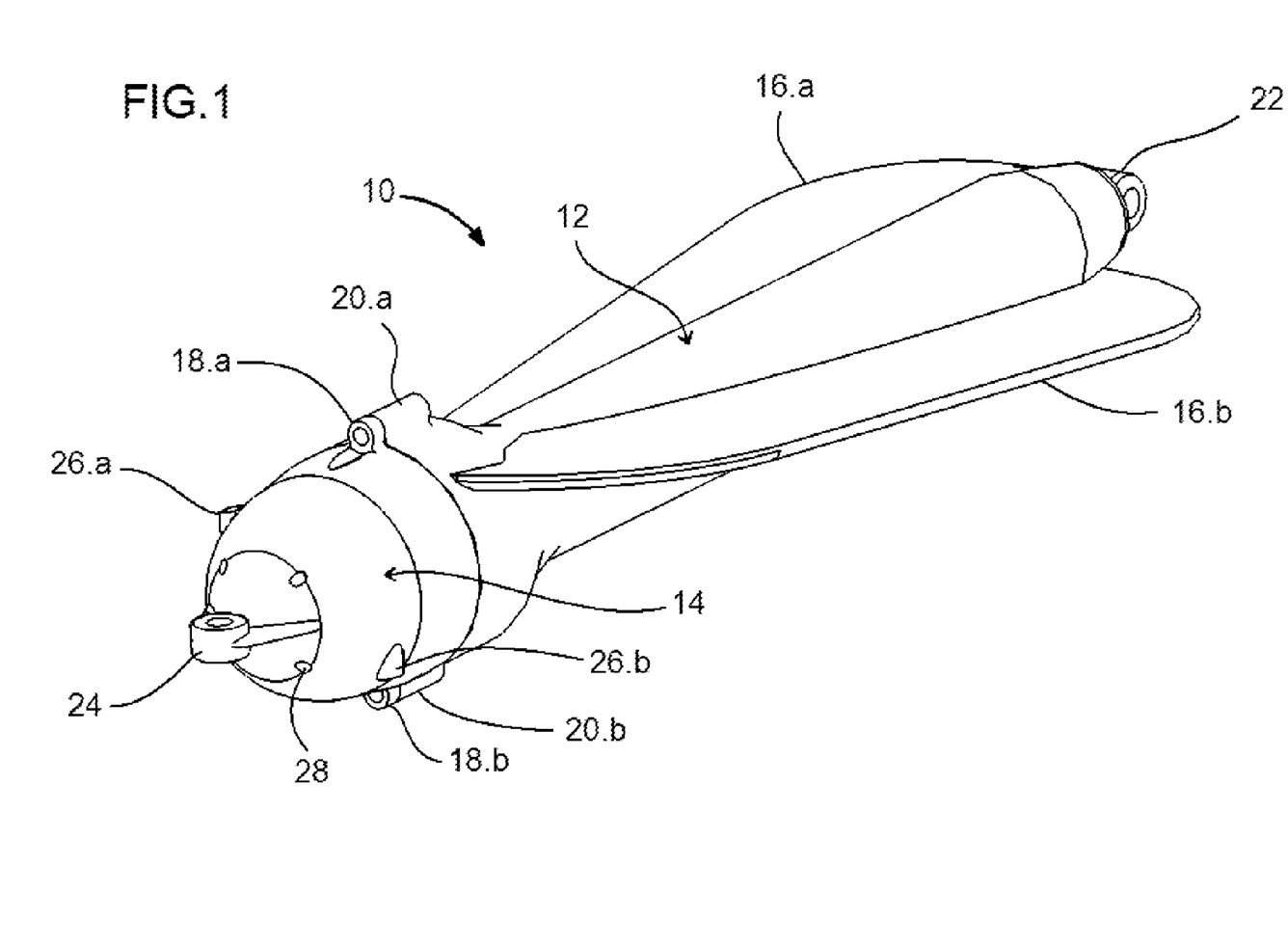
FIG. 1 is a perspective view of a fishing lure assembly in accordance with the present invention.

FIG. 1 shows a lure assembly 10 in accordance with the present invention.

As will be described in greater detail below, the lure is made up of two principal subassemblies, i.e., a conical nose segment 14, a tapered tail segment 14, The two are mounted together to form an elongate assembly, with first and second loops 22, 24 at the forward and rearward ends for attachment of a fishing line and a hook, in most instances with swivels at the attachment points.

Figure 2:
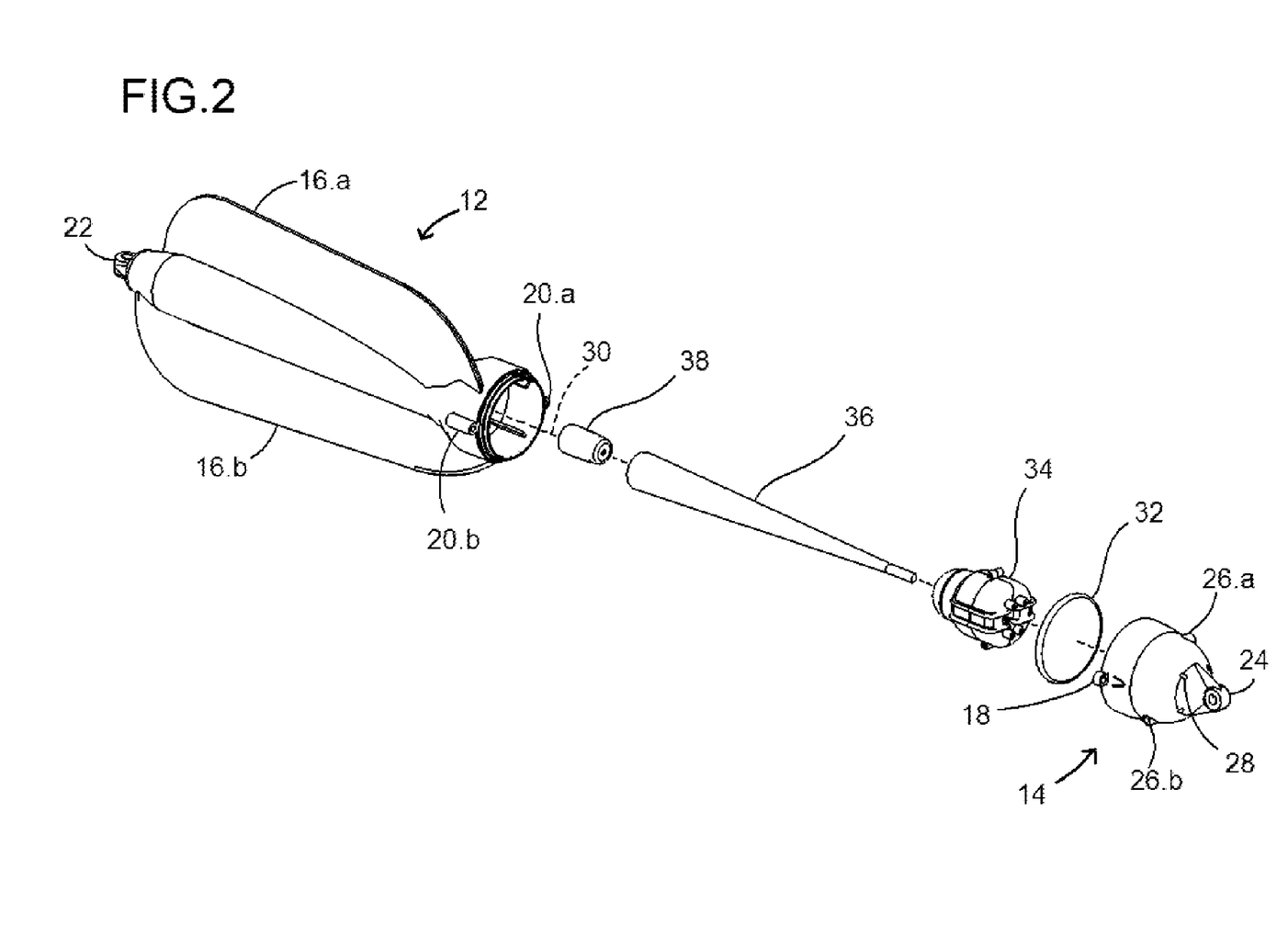
FIG. 2 is an exploded view of the fishing lure assembly of FIG. 1, showing the components thereof in greater detail.

As can be seen more clearly in FIG. 2, the two segments detachably mount to one another along the common axis 30. In the preferred embodiment that is illustrated, the connections between the members are formed by sliding bolts through side holes 18.a 18.b which are located on each side of the tail segment 14 and screwing said bolts into threaded mounting holes 20.a 20.b which are located on each side of the nose segment 12 however, it will be understood that other forms of connections may be used, such as clamps with fast release tabs and bayonet-type connections, for example.

As will be described in greater detail below, each of the segments 12, 14 provides a particular function in the overall lure assembly; the nose segment 12 contains a weight 38 within its hydro-dynamically contoured shell 12 to reduce buoyancy and keep the lure submerged during retrieval or when trolling.

The housing 12 includes a longitudinal chamber 40 that receives a steel weight 38 in the tip portion of said chamber, a chromed paper insert 36 of which fits over the outer portion of said steel weight 38, a shaft less generator 34 of which fits within the larger open end portion of said housing 12 and slides between interior sleeve arms 44 which helps secure said generator 34 within the inner chamber keeping it from rattling, along with a rubber seal 32 which covers the end portion of said housing 12 and is water tight when sealed together with said tail segment 14, said nose segment 12 holds said generator 34 steel weight 38 and chromed paper 36 firmly within said lure assembly 10 when said segments 12, 14 are securely connected with bolts at points 18 and 20. In addition, the housing portion 12 is provided with angled fins 16a, 16b, on two sides of said housing that cause the lure to rotate as it is drawn through the water and of which rotation activates said generator 34.

The housing 14 of the tail segment, includes a reservoir chamber that can hold a sponge soaked with scented fish attractant oils or amino acid power pellets, that is solubilized by water flowing into the chamber from inlet ports 26a 26b then through the chamber and discharged from outlet ports 28.

As the assembly rotates it activates the generator 34 which transmits electrical current to the light emitting diodes 52 which are mounted on top of said generator 34 and illuminate into the longitudinal chamber 40 then reflect off of the chromed paper insert 36 and outward illuminating said fins 16a, 16b.

The exteriors of the segments may also be provided, in whole or part, with reflective glitter within the translucent body for an enhanced visual pattern, such as silver- or gold-colored glitter for example. Simultaneously, the liquid scent is released from the tail section 14 into the wake of the lure, so that this passes directly over the hook that is trailed a short distance behind the assembly. Moreover, the lure assembly 10 can be reconfigured with different colored light emitting diodes and chromed paper inserts by removing and replacing them with alternate colors, which can be helpful for different species of game fish. Accordingly, the lure assembly of the present invention can be reconfigured and adapted by the fisherman to a variety of fish species, reducing the need to carry multiple lures on the boat.

Having described the overall lure assembly and its operation, the configuration of the subassemblies and the manner of their construction will now be described in greater detail.

Figure 3:
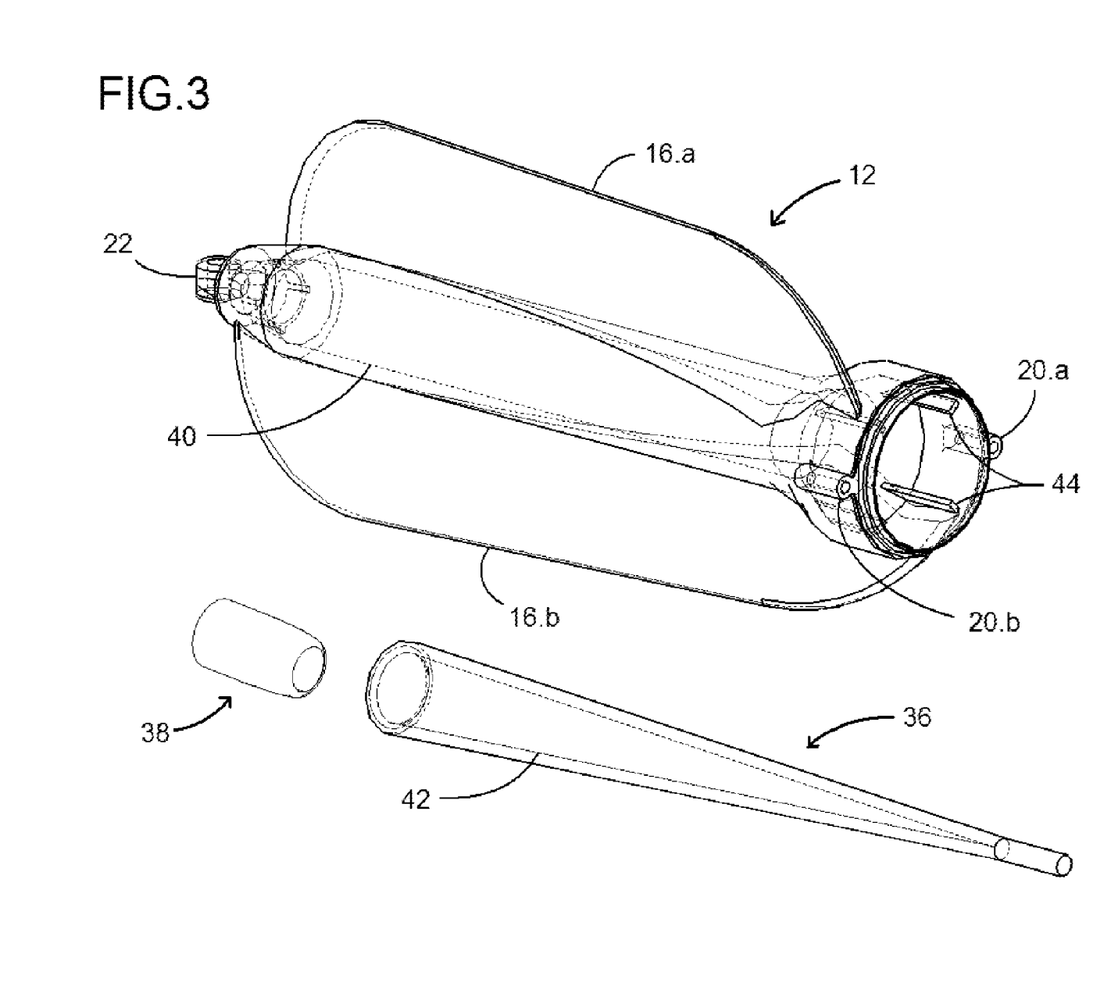
FIG. 3 is a perspective view of the forward, nose segment of the fishing lure assembly of FIGS. 1-2, along with a perspective view of the stainless steel weight and chrome paper insert.

As is shown in FIG. 3, the fins 16a, 16b of the nose segment 12 are suitably formed integrally as part of the housing, e.g., as a single piece of molded plastic (e.g., polypropylene); it will be understood, however, that in some embodiments these may be separate pieces, and that the fin in particular may be formed separately (e.g., of a flexible, rubber-like material) and then mounted to the housing by suitable means. It will also be understood that other forms of fins may be used, such as a pair of tail fins, for example. As was noted above, the housing 12 has a generally conically tapered, hydrodynamic exterior surface, and an opening at the rear of which has an interior bore 40.

The housing contains a correspondingly tapered stainless steel weight 38 that is inserted into the bore 40 and seated in the tip portion. A chromed paper insert 36 is then placed over said stainless steel weight 38 so as to hold the chromed paper thereon. A shaft less generator 34 is then placed within the mouth opening of the interior and guided into place by interior sleeve arms 44. A rubber seal 32 is then placed over the end portion of the housing 12; the segments 12 and 14 are then mounted together with bolts as described above.

Figure 4:
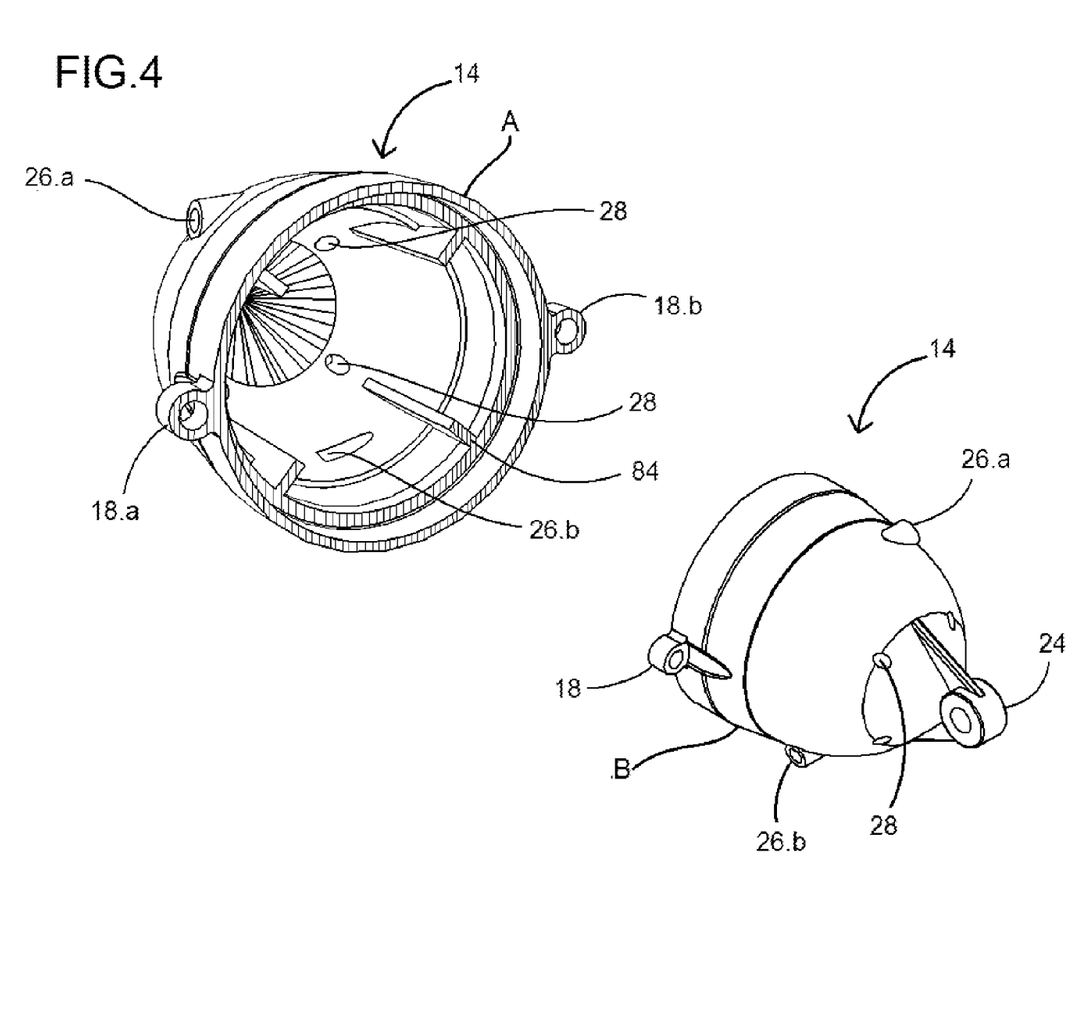
FIG. 4A is a front internal view of the tail segment of the fishing lure assembly of FIGS. 1-2, showing the inner reservoir thereof in greater detail.
FIG. 4B is a rear perspective view of the tail segment of the fishing lure assembly showing the exterior scent release holes thereof in greater detail.

As can be seen in FIG. 4-A the interior portion of the tail segment 14 has an abutment ledge 84 which the rubber seal 32 seats against as the nose portion 12 and tail portion 14 are connected together and insures a solid water tight seal.

Figure 5:
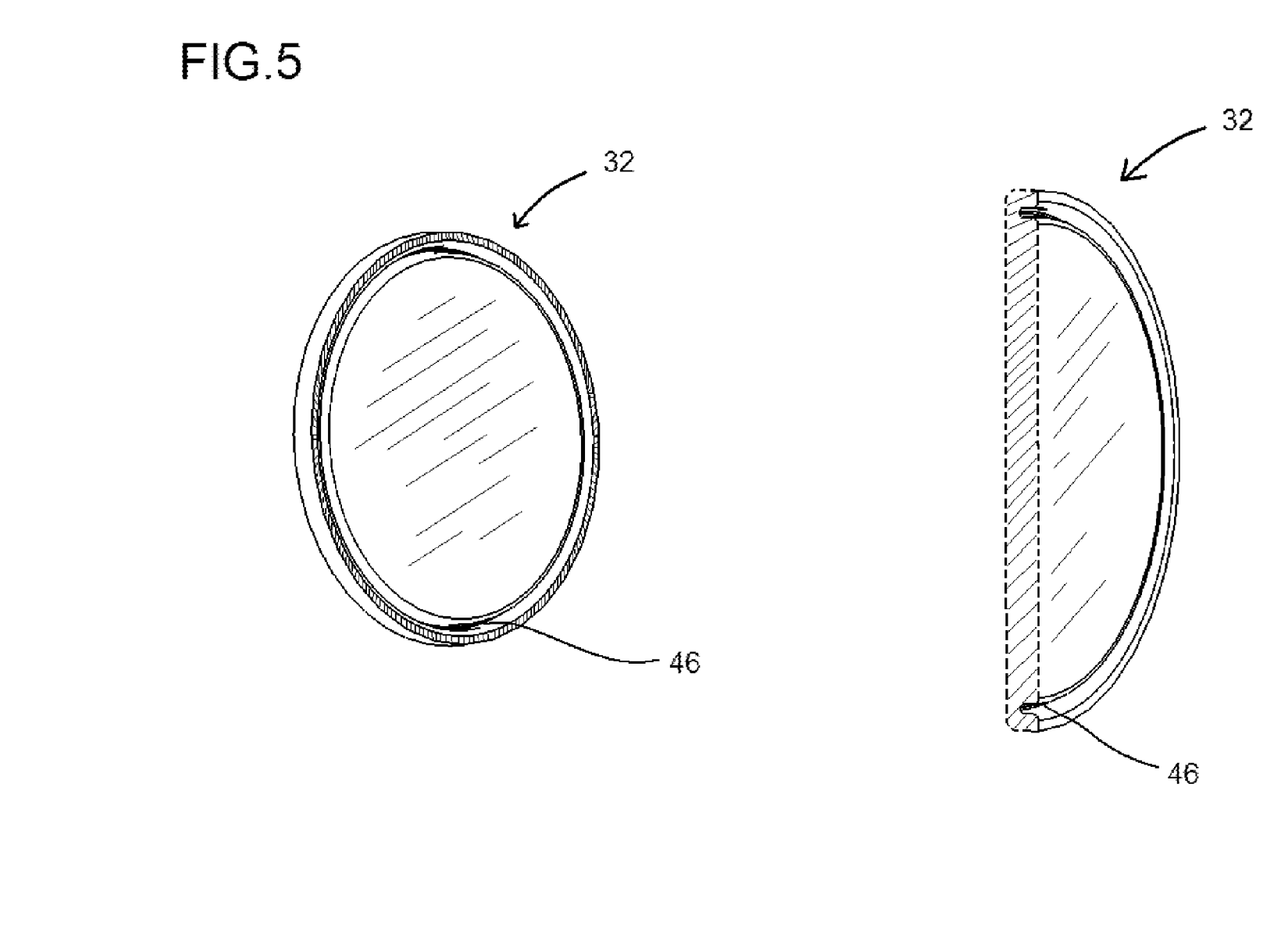
FIG. 5A is a perspective view of the rubber seal of the fishing lure assembly of FIG. 2, showing its features thereof in greater detail.
FIG. 5B is a sectioned views of the rubber seal of the fishing lure assembly of FIG. 2, showing its features thereof in greater detail.

As can be seen in FIG. 5 the seal 32 has an inner groove 46 which snuggly fits over the outer edge opening of the longitudinal chamber 40 of the nose segment 12 sealing said parts 34,36,38 within and preventing water from leaking into the chamber.

Figures 6A, 6B:
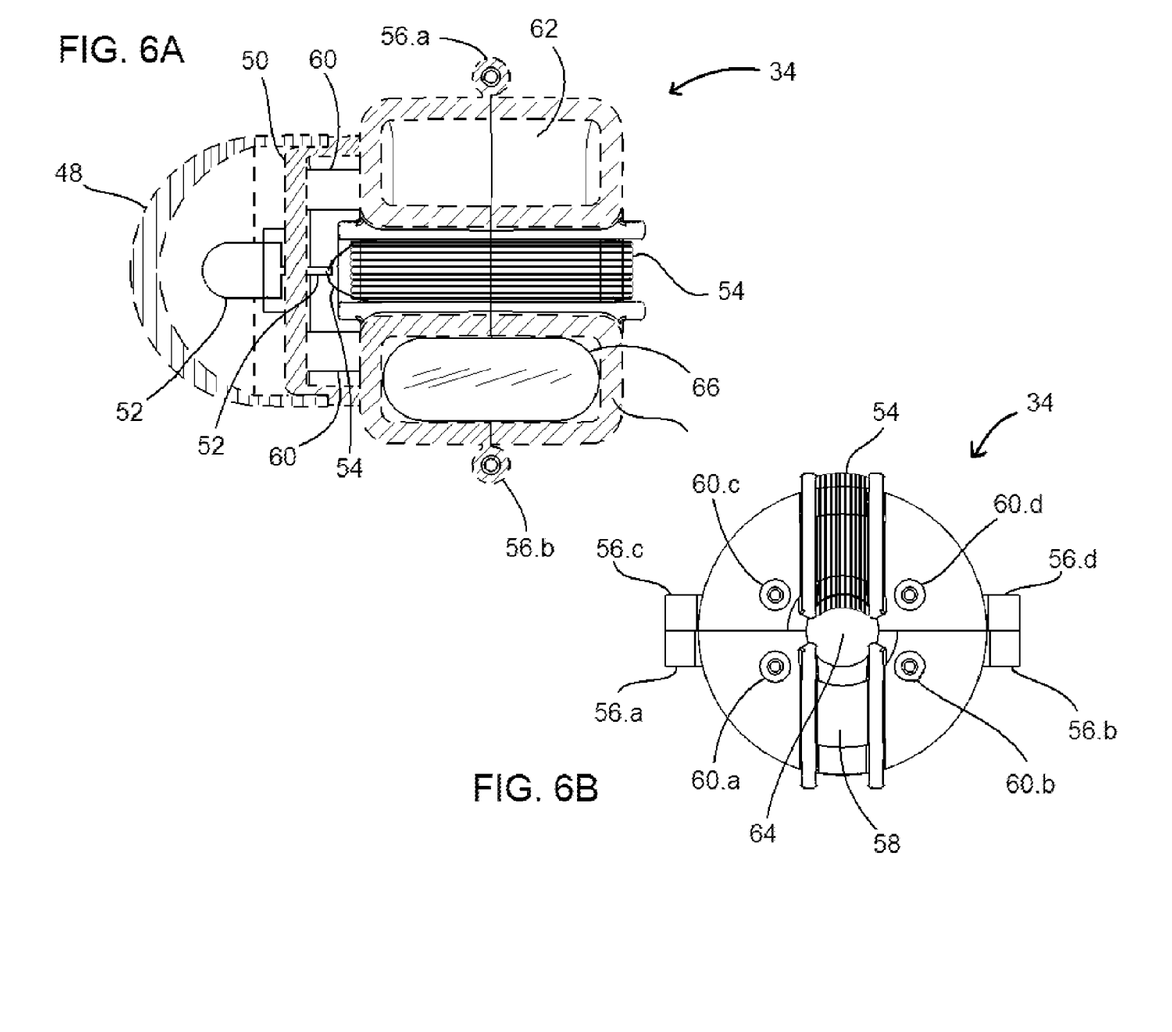
FIG. 6A is a sectioned view of the shaft less generator assembly in accordance with the present invention showing the internal components thereof in greater detail.
FIG. 6B is a top view of the shaft less generator assembly showing the center portion thereof in greater detail.

As can be seen in the side sectioned view of FIG. 6A the magnet 66 is sealed within the generator and rotates around the inner chamber 62 and through the copper coil windings 54. As can also be seen, insulated copper wire 54 is connected to the light emitting diode posts 52. The light emitting diode socket plate 50 is connected to the generator 34 by four posts 60 which are fastened by screws, the light emitting diodes 52 is pushed into socket 92 on the diode plate 50; the magnifier dome 48 is placed over the diode plate 50 and fastens to the plate by a snap on or screw on mounting.

The generator housing is held together by screws which are screwed into exterior mounts 56a, 56b, 56c, and 56d. The insulated copper wire 54 is wound around channel 58 as the generator is assembled. The center hole 64 shows the generator design allows the copper wire 54 to be wound around each side of the housing during assembly which is better understood in the following figures.

Figure 7:
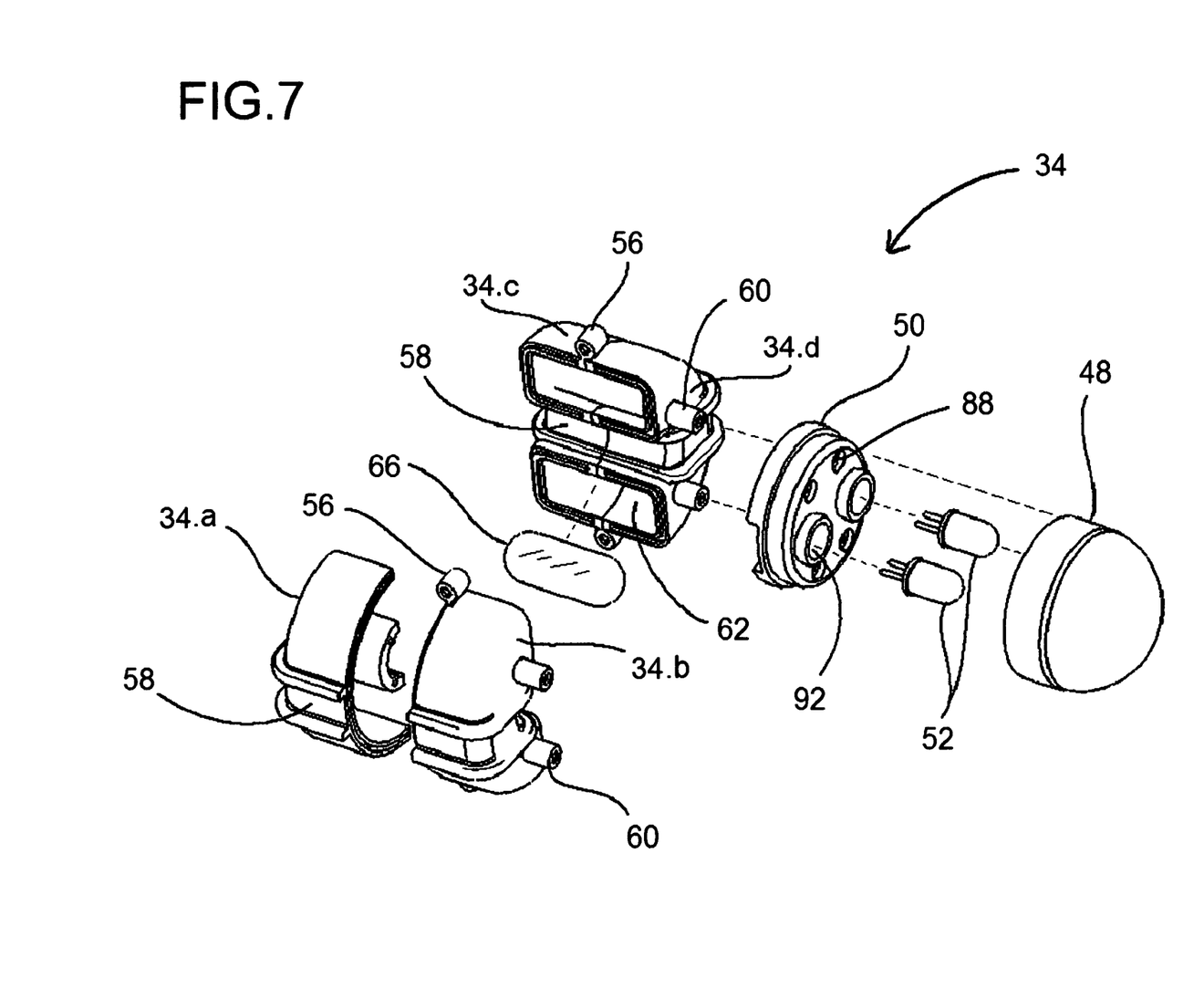
FIG. 7 is a perspective exploded view of the generator assembly of the present invention showing the manner in which this is assembled.

FIG. 7 shows an exploded view of the generator 34.

As can be seen the generator housing consists of four main body parts, 34a, 34b, 34c, 34d of which 34a and 34b are assembled together at which point the insulated copper wire 54 is wound around the channel 58, the magnet 66 is then placed into the hollow circular chamber 62 and the housing parts 34c, 34d are fastened together with 34a, 34b by mounting screw arms 56.

The light emitting diodes 52 are then inserted into sockets within the diode plate 50, the copper wire 54 is then soldered to the light emitting diodes 52, said diode plate 50 is then fastened to the generator by brass or stainless steel non-magnetic screws through holes 88 in the diode plate which screws into posts 60 on the generator assembly.

The magnifying dome 48 is then fastened to the diode socket plate 50 by either snap on or screw on connections.

Figure 8:
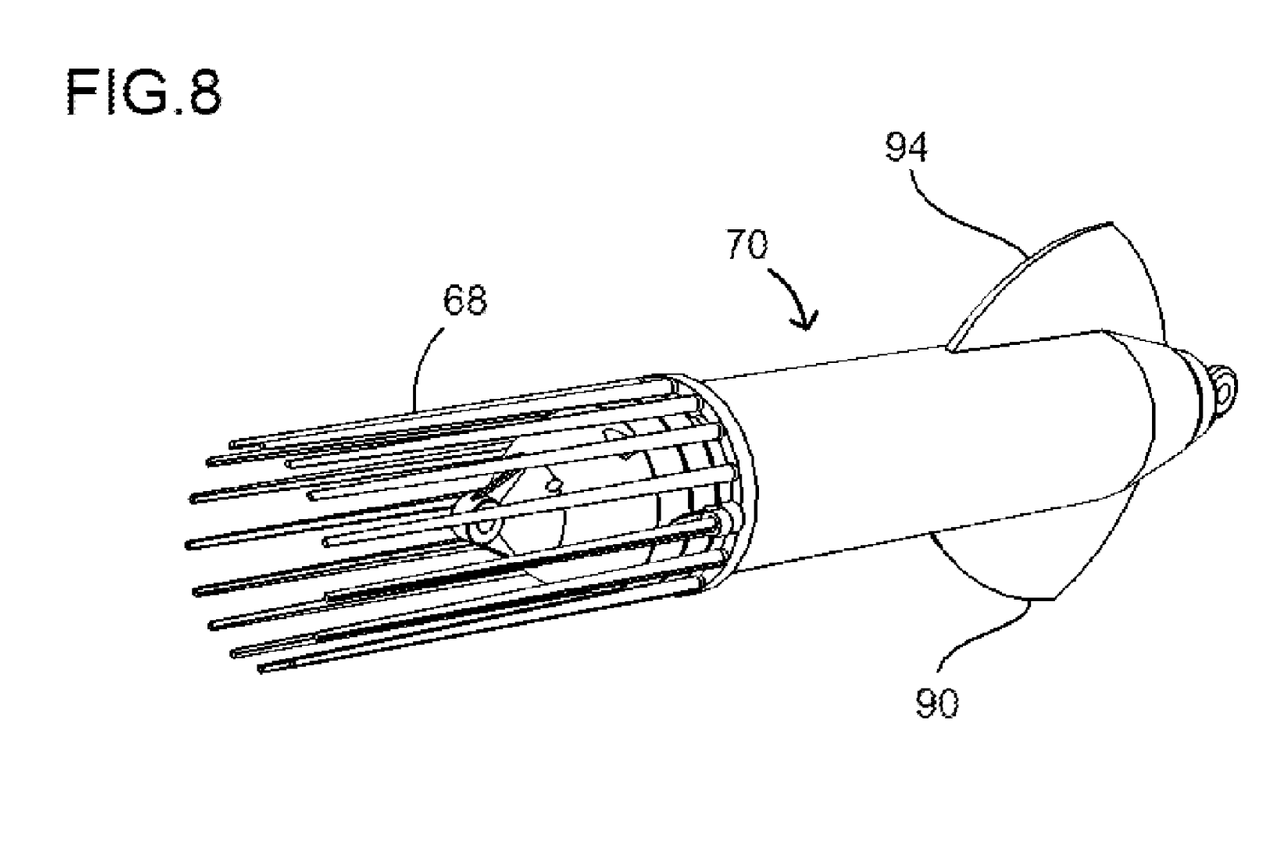
FIG. 8 is a rear perspective view of a squid lure body design which has all the attributes of the fishing lure of FIGS. 1-2, designed with smaller fins, along with removable rubber tentacles/legs.

FIG. 8 shows a rear perspective view of a lure assembly 70 which incorporates the use of removable rubber tentacle legs 68 along with squid fins 94 to simulate the look of a squid, the only changed to the lure assembly 70 from that of the assembly in FIG. 1 assembly 10: is a change in the size and angle to the fins 90 along with adding removable rubber tentacle arms 68 which attach to the exterior to make the lure appear like that of a squid swimming through the water.

The internal portion of the lure assembly 70 is identical to that of the lure assembly in FIG. 1 assembly 10 with the same tail segment 14 as assembly 10 and only having the exterior fins 16 changed to a smaller fin shape 94.

Figure 9A:
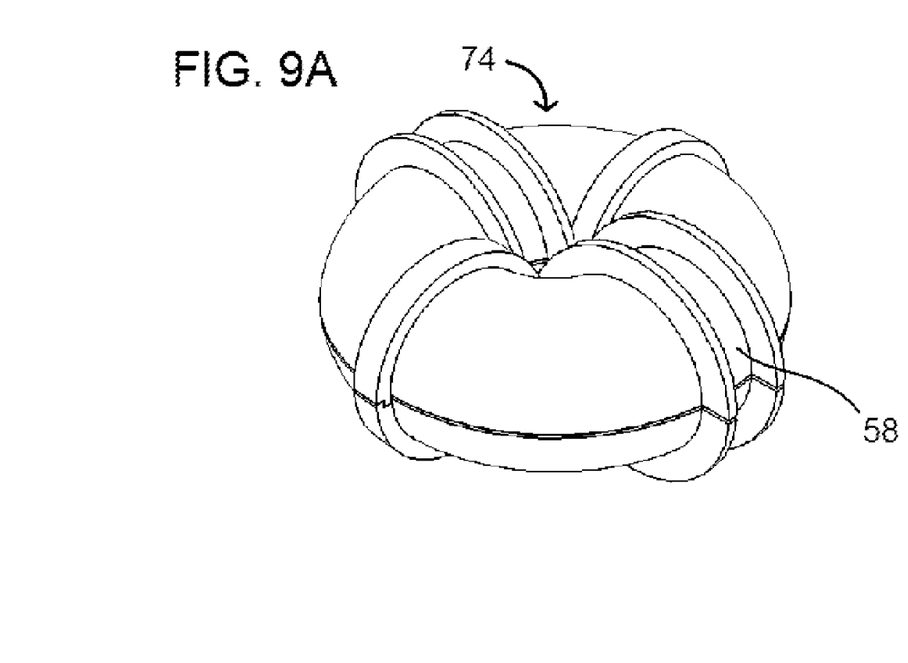
FIG. 9A is a perspective views of a shaft less generator wherein the body is a round donut shape.

FIG. 9A shows a perspective view of a shaft less generator housing 74 in which the housing is a rounded donut shape with a channel 58 for winding insulated copper wire around the outer portion within said channel.

Figure 9B:
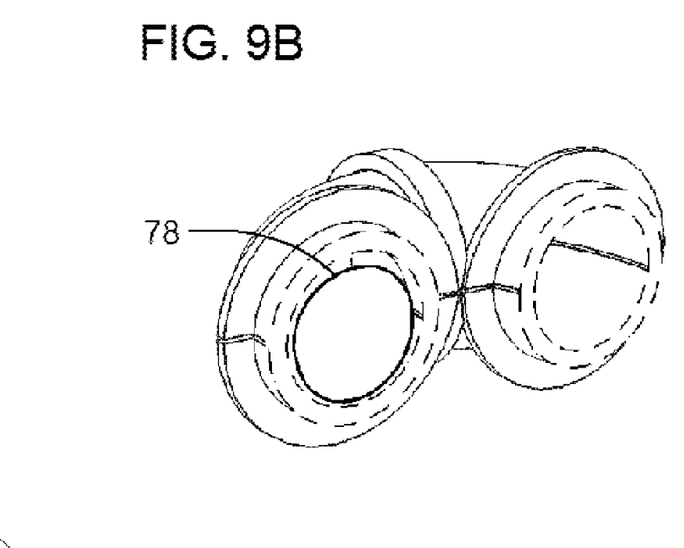
FIG. 9B is a sectioned views of a shaft less generator wherein the body is a round donut shape, and which incases a round ball shaped permanent magnet.

FIG. 9B shows a sectioned view of the same housing as in FIG. 9A showing the internal magnet 78 of being spherical in shape.

The generator housing 74 can be placed within the lure housing 12 or 70 in place of generator housing 34 allowing the lure to be used as a jigging lure which is pulled upward in the water and dropped downward, the rounded generator housing 74 along with the ball magnet 80 allows the generator 74 to be activated in any position when spinning and does not need to be pulled through the water in a parallel position but can be jigged up and down with nose of the lure facing towards the water surface and tail facing the ocean or lake bottom.

Figure 10:
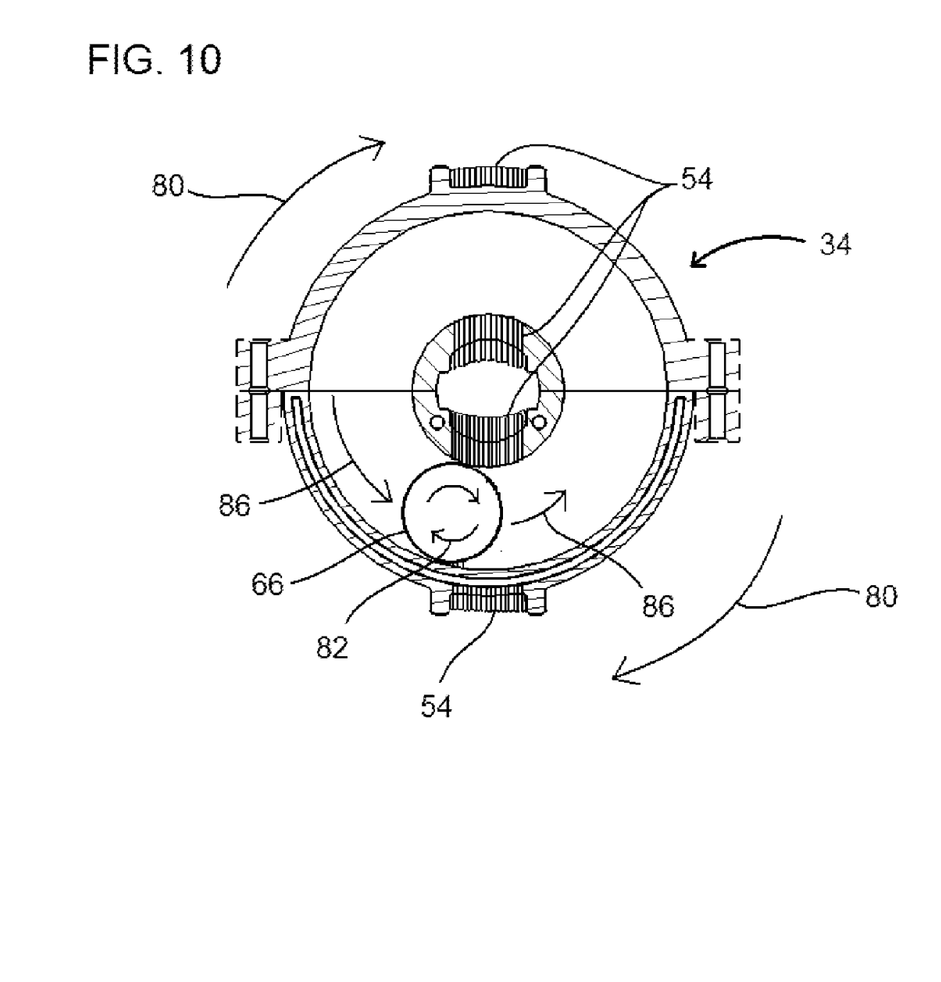
FIG. 10 is a sectioned top view of said generator showing the internal chamber and the direction in which the magnet rotates within, passing through copper coil windings and the direction the generator spins/rotates within the lure body while being trolled or retrieved through the water.

FIG. 10 is a sectioned view of the shaft less generator 34 showing the direction 82 in which the magnet 66 spins/rotates within the generator 34 and the direction 86 in which it passes through the copper wire coil 54 while the generator 34 is spinning/rotating within said lure assembly 10 and the direction 80 in which the generator is spinning/rotating while said magnet 66 is passing through said copper coil windings 54.

It is to be recognized that various alterations, modifications, and/or additions may be introduced into the constructions and arrangements of parts described above without departing from the spirit or ambit of the present invention as defined by the appended claims.

What is claimed is:
1. A fishing lure assembly comprising:
a first portion comprising a housing having a first chamber portion holding a shaft less generator with light emitting diodes attached to said generator and a an elongated second chamber portion which is smaller in size than the first chamber portion and holds a stainless steel weight and a chromed paper insert therein, said shaft less generator comprising:

a generator housing having a longitudinal axis and a round inner chamber therein;

a magnet located inside and movable within said round inner chamber;

windings on said generator housing which are electrically connected to said light emitting diodes, said windings being wound around at least a portion of the generator housing and at least a portion of said round inner chamber such that a portion of the windings is located between said longitudinal axis of said generator housing and said round inner chamber, and wherein said magnet moves inside said round inner chamber both within a plane that is transverse to said longitudinal axis of said generator housing and through the windings to generate electrical current to cause the light emitting diodes to emit light;

a second portion having a reservoir for holding a supply of scent material; and means for creating a flow of water through said reservoir so that said scent material is solubilized therein and released from said lure assembly.

2. The lure assembly of claim 1, further comprising: means for detachably connecting said first and second portions of said lure assembly.

3. The lure assembly of claim 2, wherein said first portion of said lure assembly being made of a translucent material for allowing light generated by said light emitting diodes to project there through.

4. The lure assembly of claim 3, wherein the translucent material comprises plastic has glitter or other reflective material added to reflect the light emitting from the light emitting diodes.

5. The lure assembly of claim 1, further comprising: means for imparting rotation to said lure assembly in response to said lure assembly being drawn through water, so that said shaft less generator is activated by the rotation of said lure assembly.

6. The lure assembly of claim 5, wherein said means for imparting rotation to said lure body comprises fins on said first portion.

7. The lure assembly of claim 5, wherein said means for imparting rotation to said lure assembly comprises: two angled fins located at opposite sides of the first portion, positioned along a length of said first portion, of which cause the lure assembly to spin in one direction.

8. The lure assembly of claim 1, wherein said reservoir further comprises an interior reservoir chamber and said means for creating a flow of water through said reservoir comprises: an inlet portion for introducing said flow of water to said interior reservoir chamber; and a discharge port for releasing said flow of water from said interior reservoir chamber.

9. The lure assembly of claim 8, wherein said inlet port comprises: a mouth opening that faces towards a direction of rotation of said lure assembly, so that rotation of said assembly forces water into said mouth opening so as to create a positive flow through said reservoir.

10. The lure assembly of claim 1, wherein said stainless steel weight is removable and comprises weights of different sizes to allow for different buoyancies of the lure assembly.

11. The lure of claim 1 wherein there is at least one angled fin on said first portion for imparting rotation about a longitudinal axis of said lure assembly in response to said lure assembly being drawn through water.

12. The lure assembly of claim 1, further comprising: first and second attachment loops at forward and rearward ends of said lure assembly for attachment of fishing lines and hooks thereto.

13. A fishing lure assembly comprising:

a nose segment having a weight for submerging said lure assembly, a small diameter receiver for holding a chromed paper insert, and a large diameter receiver holding a shaft less generator with light emitting diodes attached thereon, so that light generated thereby is projected onto said chromed paper insert and into surrounding water, said shaft less generator comprising:

a generator housing having a longitudinal axis and a round inner chamber therein;

a magnet located inside and movable within said round inner chamber;

windings on said generator housing which are electrically connected to said light emitting diodes, said windings being wound around at least a portion of the generator housing and at least a portion of said round inner chamber such that a portion of the windings is located between said longitudinal axis of said generator housing and said round inner chamber, and wherein said magnet moves inside said round inner chamber both within a plane that is transverse to said longitudinal axis of said generator housing and through the windings to generate electrical current to cause the light emitting diodes to emit light;

a tail segment having a reservoir for holding a liquid scent soaked sponge or a dry solid scent material which dissolves when hydrated within the chamber and discharging said liquid scent or scent material into said surrounding water;

means for mounting together said nose and tail segments;

angled fins on said nose segment for inducing rotation of said lure assembly about a longitudinal axis of said lure assembly in response to said lure assembly being drawn through said surrounding water.

14. The lure assembly of claim 13, wherein said reservoir of said tail segment comprises: a reservoir chamber within an interior of said tail segment; at least one inlet port for introducing a flow of water to said reservoir chamber so as to solubilize said liquid scent or scent material therein; and at least one outlet port for releasing said flow of water from said reservoir chamber so that said liquid scent or scent material solubilized therein is discharged into said surrounding water; said inlet opening having a mouth at a surface of said tail segment that faces towards a direction of rotation of said lure assembly so that water is forced into said opening so as to establish a positive flow through said reservoir chamber; an outlet opening for releasing said flow of water from said reservoir chamber with said liquid scent or scent material solubilized therein; and an attachment loop at said rearward end of said tail segment.

15. A fishing lure assembly, comprising:

a nose segment comprising a conically tapered housing having forward and rearward ends, an attachment loop at said forward end of said housing, a connector portion at said rearward end of said housing, at least one angled fin on said housing for imparting rotation about a longitudinal axis of said lure assembly in response to said lure assembly being drawn through water, and a longitudinal bore for receiving a steel weight and a chromed paper insert, said longitudinal bore having therein a shaft less generator with light emitting diodes, and said nose segment is comprised of a translucent material so to allowing light generated by said light emitting diodes to project therethrough, said shaft less generator comprising:

a generator housing having a longitudinal axis and a round inner chamber therein;

a magnet located inside and movable within said round inner chamber;

windings on said generator housing which are electrically connected to said light emitting diodes, said windings being wound around at least a portion of the generator housing and at least a portion of said round inner chamber such that a portion of the windings is located between said longitudinal axis of said generator housing and said round inner chamber, and wherein said magnet moves inside said round inner chamber both within a plane that is transverse to said longitudinal axis of said generator housing and through the windings to generate electrical current to cause the light emitting diodes to emit light; and a tail segment with an other connection portion, wherein the connector portion and the other connector portion allow the nose segment to be joined to the tail segment.

* * * * *